United States Patent
Myers et al.

US006445796B1

(10) Patent No.: US 6,445,796 B1
(45) Date of Patent: Sep. 3, 2002

(54) AUTOMATIC TELEPHONE-LINE DISCONNECT SYSTEM

(75) Inventors: Edwin C. Myers, Temple Hill; Theodore J. Rauen, Suitland, both of MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 04/635,952

(22) Filed: Apr. 25, 1967

Related U.S. Application Data

(63) Continuation-in-part of application No. 04/532,529, filed on Feb. 28, 1966, now Pat. No. 6,192,128.

(51) Int. Cl.[7] ............................................. H04K 1/00
(52) U.S. Cl. .......................... 380/257; 380/52; 380/59
(58) Field of Search .......................... 179/15; 307/131; 713/200; 380/252–255, 257, 41, 287, 52, 59, 38, 359, 275; 455/116

(56) References Cited

PUBLICATIONS

ARRL Handbook, American Radio Relay League, Thirty-first Edition, 1954, p 204.*

* cited by examiner

Primary Examiner—Bernarr E. Gregory
(74) Attorney, Agent, or Firm—John J. Karasek; Jane B. Marciniszyn

(57) ABSTRACT

A telephone disconnect system having a current-sensitive relay which automatically operates to electrically connect the telephone lines to the telephone network when the cradle switch of the telephone is closed, and which automatically operates to electrically disconnect the telephone lines from the telephone network when the cradle switch is open thus providing protection against the use of a cradled telephone as a clandestine listening device.

20 Claims, 2 Drawing Sheets

AUTOMATIC TELEPHONE-LINE DISCONNECT SYSTEM

CROSS REFERENCE TO RELATED APPLICATION

This application is a continuation-in-part of application, Ser. No. 04/532,529, filed Feb. 28, 1966 for CURRENT-SENSITIVE TELEPHONE-LINE DISCONNECT SYSTEM now U.S. Pat. No. 6,192,128.

BACKGROUND OF THE INVENTION

The present invention relates generally to improvements in telephone-line disconnects and the like, and more particularly to new and improved automatic current-sensitive telephone-line disconnects. The disconnects of this invention operate to close the telephone lines when the telephone handset is lifted and the telephone cradle switch is closed; and in the multiline telephone disconnect when a line selection switch is also closed. The disconnects continue to operate when the telephone is being used so as to maintain the telephone line connections between the incoming lines and the telephone network. The disconnect also automatically operates to break all telephone connections between the incoming lines and the telephone when the handset is cradled and the line current drops to zero, so as to prevent the use of the cradled telephone for clandestine listening techniques.

In the field of telephone-line disconnects it has been the general practice to employ manual-type disconnects, such as a plug and jack, to break all telephone connections. Although such devices have served the purpose they have not proved entirely satisfactory under all conditions of service for the reasons that they rely on the user and require him to manually connect the lines prior to each telephone call and then disconnect all lines after each call is completed. This necessity for manual disconnection of the telephone lines is particularly bothersome and time consuming when the telephone includes a plurality of lines for auxiliary purposes in addition to the voice lines, and where a large number of plugs and jacks are involved.

In addition, the telephone-disconnect system disclosed in application, Ser. No. 532,529, filed Feb. 28, 1966 now U.S. Pat. No. 6,192,128 required that a switch be added either in the telephone instrument or externally in close proximity to the telephone. The operation of this switch would initiate the closing of the disconnect. Another disadvantage of the previous disconnect which is overcome by the disconnect disclosed herein is the fact that in the previous disconnect if a telephone line was placed in a hold condition, another line had to be selected within a short time interval or the disconnect would open all telephone lines entering the telephone instrument. Once the disconnect opened all the incoming lines, the additional telephone key bad to be depressed and then the cradle switch or the push button switch had to be closed again in order to reconnect the incoming lines to the telephone.

SUMMARY OF THE INVENTION

The general purpose of this invention is to provide a telephone-line disconnect which embraces all of the advantages of similarly employed devices and which possesses none of the aforedescribed disadvantages. The present invention provides automatic protection against the use of cradled telephones as clandestine listening devices by protecting against such techniques as radio-frequency saturation, audio pickup, and hidden transmitters which use the telephone set as a source of power. Several embodiments of single and multiline disconnects are included in this invention in order to meet various operational requirements such as, for example, variations in available telephone line current in different countries.

Each embodiment of this invention uses the same basic principles of operation and provides the best possible automatic isolation between the cradled telephone and all outside wiring by using circuit-breaking devices, such as relay contacts, to break the connections. when the telephone is not in operation, open relay contacts disconnect the telephone from all incoming lines. Means are provided to automatically operate the relays and close the contacts when the telephone is to be used. Upon completion of a call, the handset is cradled and the line current drops to zero which automatically disconnects all wiring to the telephone, thus precluding the necessity of the user disconnecting the multiplicity of lines after each call. In this way the successful operation of the disconnect is not dependent upon the user and is not subject to compromise by personnel error as are manual disconnects. In addition, the system of this invention provides an additional feature not provided by the disconnect system disclosed in application, Ser. No. 532,529 filed Feb. 28, 1966. When a hold is placed on a line in the invention described herein the disconnect will open, but when a new line is selected a switching transient will again cause the multi-line disconnect to automatically close the telephone lines to the telephone network. The system of this invention is completely automatic and the telephone lines are automatically connected and disconnected from the telephone depending upon whether the cradle switch is closed or open, respectively, and in the case of the multi-line disconnect, depending upon whether the line-selection button is closed or open.

An object of the present invention is the provision of a telephone-line. disconnect system which will automatically protect against the use of cradled telephones as clandestine listening devices.

A further object of the invention is the provision of the above-mentioned disconnect system wherein a switching transient caused by operation of the cradle switch or line-selector switch controls the closing of all the telephone lines to the telephone network.

Another object is to provide a telephone-line disconnect system wherein the telephone line current is used to control the opening and closing of all the telephone lines.

Still another object is to provide a telephone-line a disconnect system which automatically disconnects all telephone lines when the telephone is cradled and is not in use.

Yet another object of the present invention is the provision of the above-mentioned disconnect system which will be capable of operation for a wide range of telephone line currents.

Another object is to provide a telephone-line disconnect system which will provide protection against such listening techniques as radio-frequency saturation, audio pick-up and the use of hidden transmitters which use the cradled telephone as a source of power.

A still further object of this invention is to provide a telephone disconnect system which is not dependent upon the user for its operation and which is not subject to compromise because of personnel error.

With these and other objects in view, as will hereinafter more fully appear, and which will be more particularly pointed out in the appended claims, reference is now made

DESCRIPTION OF THE PREFERRED EMBODIMENTS

Figure 1:
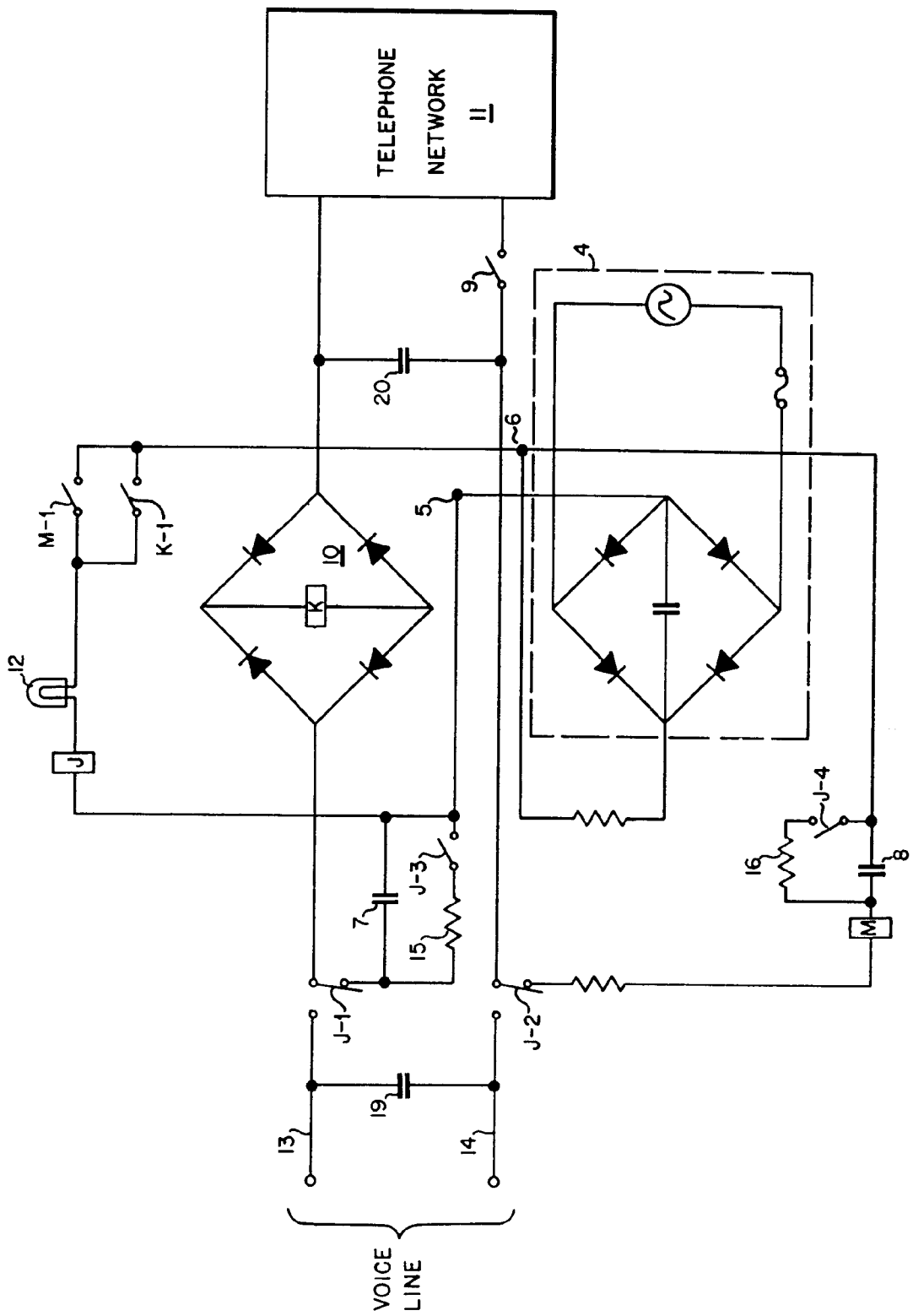
FIG. 1 shows a schematic view of a single-line, automatic disconnect system.

Referring now to the drawings, there is shown in FIG. 1 a circuit which embraces the basic principle of the present invention, e.g. the closing of telephone lines by sensing a switching transient and the opening of the telephone lines by current-sensing means, such as a relay, which relay is controlled by the telephone-line current. In addition, this circuit enables the operation of the disconnect merely by closing the cradle switch, without the necessity of an additional switch. A power source 4 having supply terminals 5 and 6 provides energy for operation of the disconnect. Each of the relay contacts shown in FIG. 1 is represented in its normal position, e.g. when the telephone handset is cradled. When the cradle switch 9 is closed, which occurs when the telephone handset is uncradled, charging current flows through capacitors 7 and 8. For example, current will flow from power supply terminal 5 through capacitor 7, relay contact J-1, bridge 10 and relay coil K into telephone network 11. From here the current passes through cradle switch 9, which is closed, through relay contact J-2, relay coil M, capacitor 8 and and back to power supply terminal 6. This current is of insufficient magnitude to activate the relay K, but is sufficient to momentarily activate relay M so that relay contact M-1 is then closed. When this occurs current from power supply 4 passes from terminal 5 through relay coil J and indicator light 12 through relay contact M-1 and back to terminal 6 of power supply 4. This current activates relay J which then relay contacts J-1, J-2, J-3 and J-4. The closing of relay contacts J-1 and J-2 directly connects telephone lines 13 and 14 to the diode bridge 10 and relay coil K, telephone network 11 and cradle switch 9. The telephone network 11 is, therefore, directly coupled to the telephone lines 13 and 14 and may be used to receive incoming calls or to initiate outgoing calls.

When the relay contact J-1 and J-2 are closed onto lines 13 and 14 the current through relay coil M goes to zero so that relay contact M-1 is again opened. However, at the same time, telephone line current is flowing through relay coil K in the diode bridge 10 so that relay contact K-1 is closed and the closed circuit is maintained from terminals 5 and 6 through relay coil J so that the relay contacts of the relay J remain closed. Relay K should be a slow-release relay in order to prevent the relay contact K-1 from opening during the line current interruptions which occur during dialing of the telephone. In addition, when relay J is activated, relay contacts J-3 and J-4 are closed so as to discharge capacitors 7 and 8 through resistors 15 and 16, respectively. This serves to prepare the unit for the next operating cycle.

When the user is through and the telephone handset is cradled, the cradle switch 9 is open and the telephone line current from lines 13 and 14 through diode bridge 10 and telephone network 11 drops to zero. When this occurs the relay K is deactivated so that relay contact K-1 is opened. Then, as a result, the current through relay coil J drops to zero and the relay contacts J-1, J-2, J-3 and J-4 are opened. Thus, merely, by cradling the telephone handset the telephone user has effectively disconnected the telephone network 11 from the telephone lines 13 and 14.

In addition, the capacitors 19 and 20 are connected between the telephone lines 13 and 14 at the input and output of the disconnect device so as to provide protection against the use of the telephone as a clandestine listening device by techniques such as radio-frequency saturation. As an additional security feature the warning light 12 is placed in series with the relay coil J and will be on when relay J is activated and the telephone lines 13 and 14 are coupled to the telephone network 11. When the indicator light 12 is on it indicates to the user of the telephone that the telephone network is no longer disconnected from the outside telephone lines and that it is no longer secure. It can also be seen that in the event that indicator light 12 burns out or is removed it is impossible for relay J to be activated and for telephone lines 13 and 14 to be coupled to the telephone network 11. In this way the user of the telephone can determine by looking at indicator light 12 whether or not the telephone lines 13 and 14 are in fact coupled to telephone network 11. of course any similar warning or indicating means could be used in place of the light 12 or in conjunction therewith.

The diode bridge 10 is necessary in order to maintain current flow through relay coil K in only one direction because a change in direction of direct current flow occurs in voice lines 13 and 14 when the party being called answers his telephone.

Figure 2:
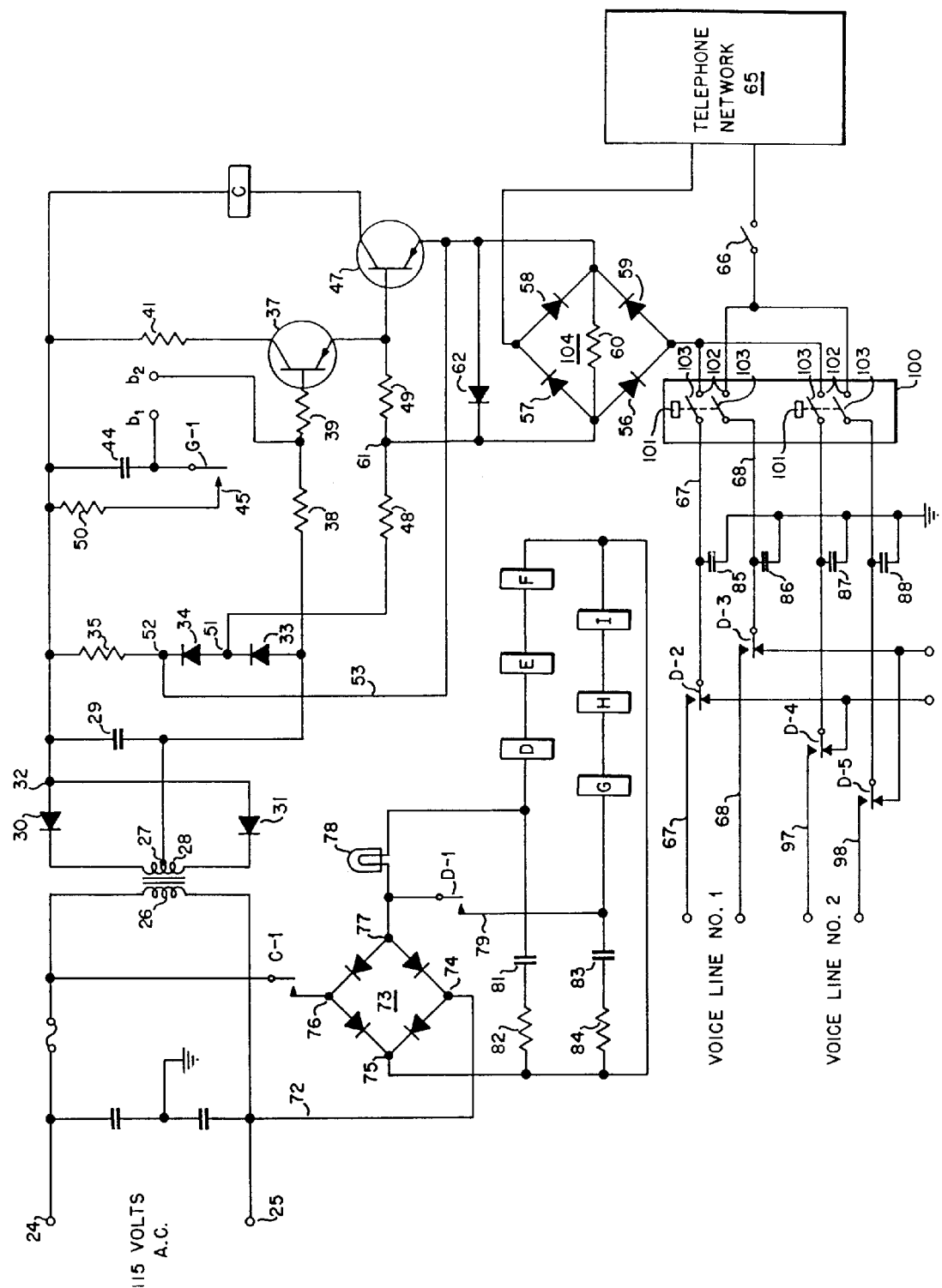
FIG. 2 illustrates a multi-line telephone disconnect system which is operated automatically.

With reference to FIG. 2 there is shown a circuit which provides a multi-line telephone disconnect capable of breaking a plurality of single telephone lines and which includes amplification means for amplifying the telephone line current when it is insufficient to operate the necessary relays. In addition, this circuit enables the operation of the disconnect to connect any one pair of incoming voice lines to the telephone network merely by closing the cradle switch and the appropriate line-selector switch without the necessity of using a third switch.

Referring now in detail to FIG. 2, there is shown a standard 115 volt AC power source which supplies power to lines 24 and 25 and, in turn, to the primary winding 26 of a transformer. A center tap 27 on the secondary winding 28 of the transformer is connected to one side of smoothing capacitor 29. The cathode sides of diodes 30 and 31 terminate at the top and bottom, respectively, of the transformer secondary winding 28, and the anode sides of the diodes 30 and 31 are connected to a common terminal on the top side of smoothing capacitor 29. The diodes 30 and 31, the center tap 27 off of secondary winding 28, and the smoothing capacitor 29 form a full-wave rectifier circuit which provides a DC voltage across the smoothing capacitor 29 wherein the bottom terminal of the capacitor is more positive than its top terminal.

Biasing diodes 33 and 34 and resistor 35 are associated in series with respect to each other so that the anode of diode 34 is connected to the cathode of diode 33 and the cathode of diode 34 is common to one end of the resistor 35. The other end of resistor 35 is connected to the top terminal of capacitor 29 and the anode of diode 33 is common to the bottom of capacitor 29.

The base of transistor 37 is connected to the bottom of smoothing capacitor 29 by current-limiting resistors 38 and 39 which are in series with respect to each other, and the collector of transistor 37 is in series with the current-limiting resistor 41, which in turn, has a terminal in common with the upper terminal of smoothing capacitor 29.

One terminal of capacitor 44 is common to the upper terminal of smoothing capacitor 29 while the other side of the capacitor 44 is connected to relay contact G-1 of DC relay G and to terminal $b_1$. The contact G-1 could be associated with any one of the relays D-I instead of with relay G. When the relay G is not activated the relay contact G-1 is not in electrical contact with the line 45. But when G is activated the contact G-1 shorts the capacitor 44 through resistor 50 thus placing it in a discharge state. In addition, terminal $b_2$ is located between resistors 38 and 39.

The base of transistor 47 is common with the emitter of transistor 37, both of which are connected by current-limiting resistors 48 and 49 to a terminal 51 located between diodes 33 and 34. The emitter of transistor 47 is made electrically common with a point 52, located between the resistor 35 and diode 34, by line 53, and the collector of transistor 47 is connected to the top terminal of capacitor 29 through dc slow-release relay coil C.

A first diode bridge circuit comprised of diodes 56 through 59 and resistor 60 is located across the base and emitter of transistor 47 in such a way that the cathodes of diodes 48 through 59 are common to the emitter and the anodes of diodes 56 and 57 are common to a point 61 located between resistors 48 and 49. In addition, a current-limiting means, such as diode 62, is across transistor 47 and the bridge circuit 104, and is located with the anode connected to the emitter of transistor 47 and the cathode connected to the point 61 between resistors 48 and 49. This diode 62 and resistor 49 will limit the amount of telephone line current which will flow through the transistor 47 for various values of telephone line current.

The telephone network 65, the cradle switch 66 and a respective voice-line-selection switch 101 are connected in series with respect to each other and with respect to the diode bridge and the telephone lines 67 and 68, which comprise one pair of the plurality of voice transmission lines associated with the telephone network 65.

The line-selector switches 101 are each comprised of two terminals 102 and two connecting lines 103. By depressing the line-selector switch 101, the connecting lines 103 are caused to come in contact with the terminals 102, and in this way the telephone user may selectively determine which pair of telephone voice lines are to be connected to the telephone network 65. Two line-selector switches 101 are shown in FIG. 2 by way of example, but it is to be understood that any number of switches may be used depending upon the number of voice lines which are associated with the network 65.

Tapped off of lines 24 and 25 are lines 71 and 72, respectively, wherein the line 72 is connected to one terminal 74 of diode-bridge rectifier 73 and wherein line 71 is connected to relay contact C-1 of the slow-release relay C, which contact touches terminal 76 of the diode-bridge 73 whenever the relay coil C is activated.

Located between the terminals 75 and 77 of diode-bridge 73, and connected in series with respect to each other, are dc relay coils D, E, and F, each with a plurality of contacts, and warning means 78, e.g. a lamp. Between the diode-bridge terminal 77 and warning lamp 78 is located relay contact D-1 which, when relay D is activated, closes onto terminal 79. The terminal 79 when connected to the relay contact D-1 forms a series circuit between diode-bridge terminals 75 and 77, which circuit comprises dc relay coils G, B and I each with a plurality of contacts. Arc-suppressing means consisting of capacitor 81 and resistor 82, which are series-connected with respect to each other, and capacitor 83 and resistor 84, which are also series-connected with respect to each other, are located in parallel, across relay coils D, E and F and across relay coils G, H and I, respectively.

As shown in FIG. 2, by way of example, the relay contacts D-2, D-3, D-4 and D-5 are closed when relay D is activated, as are similar contacts on relays E,F,G, H and I when they are activated. These relay contacts (not shown) associated with all of the relays D, E, F, G, H and I are similarly closed upon activation of their respective relays in order to close other voice, lamp and auxiliary circuits to the telephone which circuits are not shown in the FIG. 2. In addition, the capacitors 85–88 are connected between each of the telephone lines 67, 68, 97, 98, respectively, and ground so as to provide protection against the use of the telephone as a clandestine listening device by techniques such as radio-frequency saturation. Capacitors (not shown) are similarly connected with respect to all other telephone lines which may be present.

It is to be understood that any number of relays could be used and then relay coils D, E, F, G, B and I are merely shown as examples of the number of relays that could be used. The number will depend upon the number of lines associated with each individual telephone unit.

In the operation of this automatic multi-line disconnect with amplification means, a dc voltage is provided across smoothing capacitor 29 by means of the full-wave rectifier comprised of diodes 30 and 31, the transformer secondary winding 28 and center tap 27. Diodes 33 and 34 and resistor 35 act to bias transistors 37 and 47 in an off condition.

When it is desired to operate the telephone, the user need only lift the telephone handset so as to close cradle switch 66 and depress the appropriate line-selection switch 101 to use the voice line pair which he desires. When this is done the connectors 103 of the line selection switch 101 are moved against their respective contact terminals 102. The terminals $b_1$ and $b_2$ are, thus, electrically coupled together. For example, if the user desired to use the voice line pair 67–68 and if he had pressed the appropriate line-selection switch 101 and had lifted the telephone handset 80 as to close cradle switch 66, terminal $b_1$ would be coupled through relay contact D-2, contact terminal 102, coupler 103, through diode bridge 104, telephone network 65, cradle switch 66, coupler 103, contact terminal 102, and finally through relay contact D-3 to terminal $b_2$.

The resultant coupling together of terminals $b_1$ and $b_2$ enables the capacitor 44 to be charged up from capacitor 29. The transient resulting from the charging of capacitor 44 momentarily turns on transistor 37 which remains on only for the duration of the transient, i.e. until capacitor 44 is fully charged. As a result of transistor 37 being turned to an on condition, transistor 47 is also turned on, thus activating dc slow-release relay coil C which closes relay contact C-1 onto the terminal 76 of diode-bridge rectifier 73. AC line current from the lines 24 and 25 is then admitted through the bridge rectifier 73 and the direct current output from the rectifier 73 initially activates the dc relay coils D, E, and F and the warning lamp 78. The activation of relay coil D closes relay contact D-1 onto the terminal 79, thus allowing the current output of rectifier 73 to activate dc relay coils G, B and I. In addition, the activation of relays D, E and F followed by the activation of relays G, H and I, closes relay contacts D-2, D-3, D-4, D-5 and G-1 and the remaining relay contacts (not shown) which are associated with relay coils D, E, F, G, H and I. This closing of relay contacts connects the voice line pair to the telephone network 65 which has been selected by its respective line-selection switch 101, e.g.

lines 67 and 68. In addition, the closing of relay contact G-1 onto line 45 enables the capacitor 44 to discharge through resistor 50 so that the capacitor 44 is prepared to be charged up again the next time the disconnect is activated.

Voice-line current then flows through lines 67 and 68 and into the diode bridge 104 formed by diodes 56–59 and resistor 60. Part of this line current flows through the base-emitter circuit of transistor 47 and the remainder flows through diode 62.

The base-emitter current through resistor 49 and the telephone line current through resistor 60 keeps transistor 47 turned on which; in turn, maintains relay C in an activated condition. The transistor 47 remains biased on as long as current flows through the resistor 60, thus keeping relay C in an activated state.

The diode bridge 104 comprised of diodes 56–59 and resistor 60 is necessary in order to maintain current flow through resistor 60 in only one direction, and in order to keep transistor 47 biased on during operation of the telephone, because a change in direction of direct current flow occurs in the voice lines being used, e.g. 67 and 68, when the party being called answers his telephone. In addition, the warning lamp 78 is located in the circuit in such a manner that if the lamp burns out the disconnect operates to open all the telephone lines because there is no current flow through relay coils D, E, F, G, H and I. Thus, whenever the light is on the telephone user is placed on notice that the lines to the telephone are all closed and that it is possible to obtain information from these telephone lines.

In this automatic multi-line disconnect the relay C should be a slow-release dc relay so as to prevent the disconnecting of relay contact C-1 during interruptions in the telephone line current which occur as a result of the dialing of the telephone.

When the user is through with the telephone and cradles the handset, the cradle switch 66 is opened. When this occurs the current from the telephone lines 67 and 68 through diode bridge 104 and telephone network 65 drops to zero, which turns off transistor 47. Thus, the relay C is deactivated so that relay contact C-1 opens. As a result, the current through relay coils D, B, F, G, H and I is reduced to zero thus opening the relay contacts, D-2, D-3, D-4, D-5, G-1 and all relay contacts associated with the relays D through I. The telephone lines, e.g. 67 and 68, are completely severed from the telephone network 65 thus achieving the desired telephone security.

The circuitry of the disconnects of both FIG. 1 and FIG. 2 must be provided with physical security in order to prevent a compromise of the systems. Because of the simplicity of the disconnect of FIG. 1 a sealed throw-away package may be used to provide security. But, because of the complexity of the automatic multi-line unit of FIG. 2 a small steel cabinet incorporating a combination safe-type lock on the cover may be used to provide the physical security desired of the unit and still permit access for maintenance.

The capacitors 7 and 8 in the single line disconnect are intended to block dc power from the power supply 4 to the telephone instrument. Similarly, in the multiline disconnect of FIG. 2, capacitor 44 blocks dc power from the power supply to the telephone. This is done to prevent the use of the disconnect power supply by any clandestine device installed in the telephone.

This invention provides a telephone disconnect which is automatic in operation and which utilizes telephone line current. The disconnects of this invention are triggered to operate by the transient charging of capacitors, and amplification means in the multiline embodiment allow the use of the disconnect even where the unamplified telephone line current is insufficient to operate the relays of the system. This telephone disconnect protects against the use of cradled telephones as clandestine listening devices by protecting against listening techniques such as radio-frequency saturation, audio pickups and the use of hidden transmitters which use cradled telephones as sources of power. This invention provides security for the cradled telephones in a way that is not dependent upon the user for the disconnect's successful operation and therefor, the security of the cradled telephone is not subject to compromise because of personnel error. In addition, the operation of this disconnect is not dependent upon the use of any other pushbuttons or switches which are to be operated by the user except those that are already present in standard telephones and telephone networks. For example, in the case of the automatic single-line disconnect of this invention the user automatically operates the disconnect merely by opening and closing the cradle switch, e.g. by cradling and uncradling the telephone handset. In the case of the automatic multi-line disconnect, the user operates the disconnect merely by depressing the appropriate line selector switch and by cradling or uncradling the telephone handset.

Obviously many modifications and variations of the present invention are possible in the light of the above teachings. It is therefore to be understood, that within the scope of the appended claims, the invention may be practiced otherwise than as specifically described.

The invention described herein may be manufactured and used by or for the Government of the United States of America for governmental purposes without the payment of any royalties thereon or therefor.

What is claimed and desired to be secured by Letters Patent of the United States is:

1. An automatic telephone line disconnect adapted to be coupled to a telephone network, which disconnect operates to prevent the use of a cradled telephone as a clandestine listening device, comprising:

electrical lines selectively connected with respect to said telephone network and with respect to each other;

at least two energy storage means normally coupled to said electrical lines adapted to be connected with respect to said telephone network and with respect to each other; and a power supply operative to charge said energy storage means.

2. The disconnect system of claim 1, including:

a cradle switch operatively associated with said electrical lines to be placed in closed circuit relationship with said network said lines and said storage means to enable a current to flow between said storage means;

whereby said electrical lines and said network are coupled together so as to enable electrical line energy to flow through said lines and said network so that the telephone network is operable.

3. The disconnect system of claim 2, including:

normally disabled first current-sensing means coupled to one terminal of said power supply and movable to be coupled across said power supply;

said first current-sensing means including a plurality of movable contacts wherein two of said contacts normally coupled between said storage means are adapted to couple said electrical lines to said network when said first current-sensing means is activated.

4. The disconnect of claim 3, including:

normally disabled second current-sensing means coupled to a terminal of one of said storage means and adapted to be coupled in closed circuit relationship with each of said storage means;

said second current-sensing means including at least one movable contact movable to couple said first current-sensing means across said power supply when the second current-sensing means is activated.

5. The disconnect of claim 4, including:

a diode bridge coupled to said network;

third current-sensing means operatively coupled across said diode bridge to enable direct-current flow through said third current-sensing means in one direction only;

said third current-sensing means including at least one movable contact movable to couple said first current-sensing means across said power supply when the third current-sensing means is activated.

6. The disconnect of claim 5 wherein said third current-sensing means comprises a slow-release, direct-current relay.

7. The disconnect of claim 6 wherein the plurality of contacts of said first current-sensing means includes at least one contact operatively coupled across each of said storage means to discharge said storage means when said first current-sensing means is activated.

8. The disconnect of claim 7 including warning means operatively coupled with respect to said first current-sensing means to prevent operation of said first current-sensing means when said warning means is inoperable in said disconnect.

9. The disconnect of claim 8 including radio-frequency shunting means selectively coupled to said electrical lines and said network thereby preventing the use of radio-frequency saturation techniques to obtain information from said network.

10. An automatic multiline telephone disconnect system which operates to prevent the use of a cradled telephone as a clandestine listening device, and which is capable of operating over a wide range of telephone line currents, comprising:

a telephone network;

a plurality of pairs of electrical lines selectively connected with respect to said network;

normally disabled amplification means operatively associated with said network to be controlled by line current flowing through said lines and said network when the network is in an operating condition;

energy storage means selectively coupled to said amplification means;

normally disabled first current-sensing means coupled to said amplification means and operative to maintain said network and said lines in a normally open circuit relationship when said amplification means is disabled;

a normally open cradle switch in circuit relationship with said network and operable to be placed in closed circuit relationship with said network and said energy storage means;

a plurality of line-selector switches each one operatively associated with a respective one of said plurality of pairs of electrical lines to enable the selective connection of a predetermined line pair to said network;

each of said line-selector switches movable to be selectively coupled to said energy storage means;

whereby when said cradle switch and one of said line-selector switches are closed said first current-sensing means is activated so as to couple together said network and a respective pair of said electrical lines to enable electrical energy to pass through.

11. The multiline disconnect of claim 10 wherein said first current-sensing means comprises a slow-release, direct-current relay.

12. The multiline disconnect of claim 11, including:

a power supply one terminal of which is electrically coupled to one side of said energy storage means;

said power supply being coupled to charge said energy storage means when said cradle switch and one of said line-selector switches are closed.

13. The multiline disconnect of claim 12, including:

a plurality of second current-sensing means operatively associated with said first current-sensing means to be energized when said first current-sensing means is energized.

14. The multiline disconnect of claim 13 wherein each of said second current-sensing means comprises a plurality of contacts movable to couple said electrical lines to said telephone network when said second current-sensing means are energized.

15. The multiline disconnect of claim 14, including:

warning means operatively coupled with respect to said plurality of second current-sensing means to prevent energization of said plurality of second current-sensing means when said warning means is inoperable in said disconnect.

16. The multiline disconnect of claim 10, including:

a diode bridge adapted to be selectively connected in closed circuit relationship with said network and each one of said pairs of electrical lines when said cradle switch and a respective line-selection switch are closed;

whereby said amplification means is always biased on when said telephone network is energized.

17. The multiline disconnect of claim 10, including:

current-limiting means operatively associated with said amplification means to limit the maximum current flow through said amplification means.

18. The multiline disconnect of claim 10, including:

frequency shunting means operatively coupled to said electrical lines to prevent the use of radio-frequency saturation techniques to obtain information from said telephone network.

19. In combination:

a telephone network;

at least a pair of conductors selectively coupled to said network from outside said network; and automatic telephone line disconnect means coupled to said telephone network for selectively and physically disconnecting each one of said conductors from said network.

20. An automatic multiline telephone disconnect adapted to be coupled to a telephone network, which operates to prevent the use of a cradled telephone as a clandestine listening device, and which is capable of operating over a wide range of telephone line currents, comprising:

a plurality of pairs of electrical lines selectively connected with respect to said network;

normally disabled amplification means operatively associated with said network to be controlled by line current flowing through said lines and said network when the network is in an operating condition;

energy storage means selectively coupled to said amplification means;

normally disabled first current-sensing means coupled to said amplification means and operative to maintain said network and said lines in a normally open circuit relationship when said amplification means is disabled;

a normally open cradle switch in circuit relationship with said network and operable to be placed in closed circuit relationship with said network and said energy storage means;

a plurality of line-selector switches each one operatively associated with a respective one of said plurality of pairs of electrical lines to enable the selective connection of a predetermined line pair to said network;

each of said line-selector switches movable to be selectively coupled to said energy storage means;

whereby when said cradle switch and one of said line-selector switches are closed said first current-sensing means is activated so as to couple together said network and a respective pair of electrical lines to enable electrical energy to pass therethrough.

* * * * *